Aug. 15, 1944.     C. H. M. ROBERTS     2,355,678
METHOD FOR REMOVING IMPURITIES FROM HYDROCARBONS
Filed Aug. 21, 1939
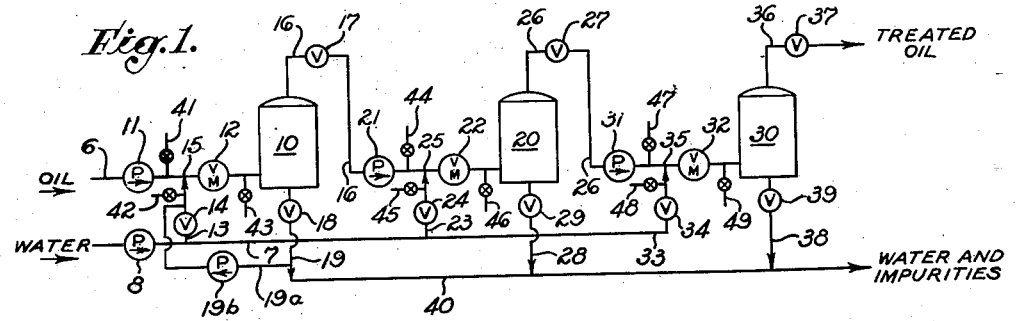
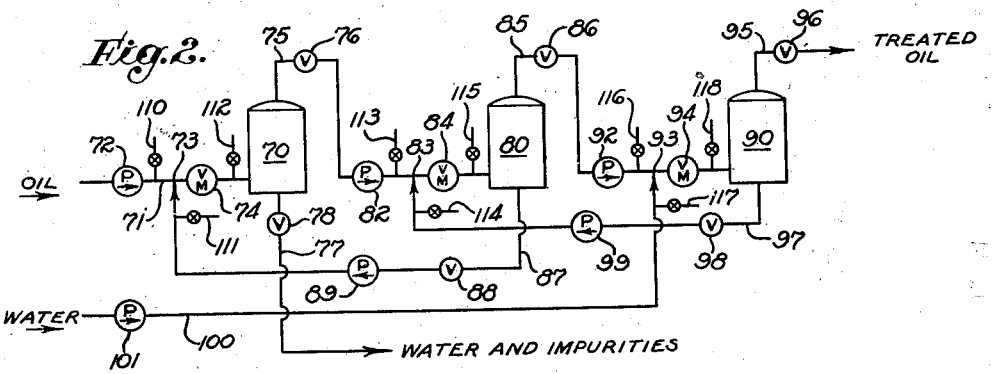
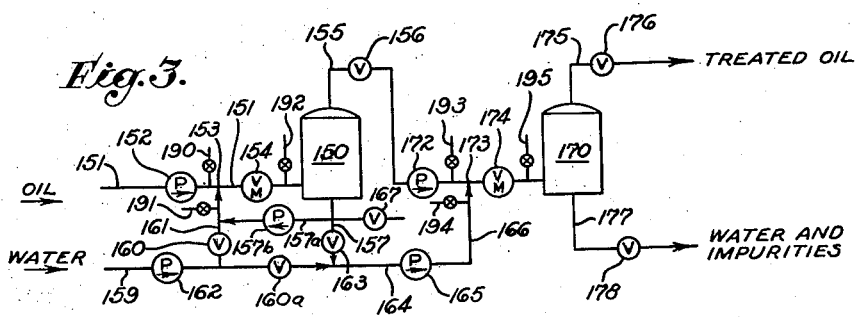
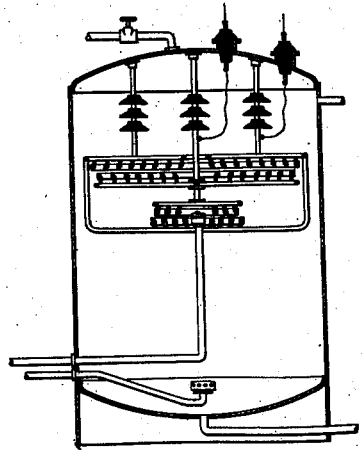
INVENTOR
CLAUDIUS H.M.ROBERTS
BY
HARRIS, KIECH, FOSTER & HARRIS
FOR THE FIRM
ATTORNEYS Patented Aug. 15, 1944

2,355,678

UNITED STATES PATENT OFFICE 2,355,678

METHOD FOR REMOVING IMPURITIES FROM HYDROCARBONS

Claudius H. M. Roberts, Palos Verdes Estates, Calif., assignor to Petrolite Corporation, Ltd., Wilmington, Del., a corporation of Delaware Application August 21, 1939, Serial No. 291,215

15 Claims. (Cl. 204—190)

This invention relates to the purification of oils and, more particularly, to methods and apparatus for removing water-dispersible impurities from oil.

By "water-dispersible" impurities, I have reference to impurities which may be dispersed in water, either to produce a homogeneous solution, as in the case of water-soluble impurities which are miscible with or soluble in the water and which, when dissolved in water, may be regarded as molecularly or ionically dispersed therein, or to produce a water-continuous dispersion comprising the impurity as the internal phase, as in the case of water-wettable water-insoluble impurities. Such water-dispersible impurities, i. e., impurities which are either water-soluble or water-wettable, are most frequently present in the oil in the form of, or associated with, small liquid droplets or solid particles dispersed or emulsified throughout the oil, but may, in some instances, be in solution in the oil, as in the case of certain inorganic acids which are soluble both in oil and water.

The removal of water-soluble or water-wettable impurities from oil is a problem which is frequently encountered and which is of particular importance in the handling of crude petroleum containing dispersed salt or oil field brine, and also in the removal of reagents and reaction products in refining distillates. The dispersed, and frequently very highly stabilized, condition of the impurities which it is desired to remove makes it difficult or impossible to accomplish the desired purification by ordinary methods, such as washing or mild agitation with water. Furthermore, the immediate application of processes designed to remove dispersoids from the oil, such as electrical or chemical dehydration processes, is usually unattended with success because of several reasons, including the definite limitations on their power of resolution, the oil treated thereby never being completely freed from dispersed brine and similar impurities, so that the concentration of impurities directly attributable to the residual dispersed phase in a dehydrated oil frequently makes it unsuitable for the further purposes at hand.

Processes have been developed, however, which, within certain limits, accomplish the desired degree of purification. These processes, in general, comprise the dispersion of relatively pure water in the oil to be treated, for example a relatively fresh water, thereby forming a complex dispersed phase consisting of both the original dispersed material and a secondary dispersed phase consisting of the added and relatively pure water. This complex dispersion is subjected to an electric field adapted to bring the impurities and the added water together and to coalesce the dispersed water, thereby causing the dispersed impurities to become associated with and dispersed in the added water. Upon separation of the aqueous material from the oil, it has been found that a very material reduction in salt or other water-soluble or water-wettable impurities is obtained even though the residual water content of the treated oil is as high as, or higher than, the water content of the oil initially subjected to the treatment. In effect, electric treatment in the presence of the secondary relatively pure dispersed phase produces a treated oil in which the residual dispersed water is, to a substantial extent, derived from the added relatively pure water rather than from the impure dispersion originally associated with the oil, so that, to this extent, a displacement of the impure dispersed phase by the relatively purer secondary dispersion may be said to have taken place.

There are, however, definite limitations on the efficiency of the process just described. In general, the degree of purification is, to some extent, dependent upon the quantity of dispersed water relative to the oil being treated but, as a rule, this increase in efficiency diminishes very rapidly when quantities of water exceeding 20% to 25% of the oil are used so that, in effect, the degree of purification corresponding to the use of about 20%, or sometimes less, of water represents the best practical purification or desalting obtainable. In practice, many factors enter to limit the amount of water which it is practicable to employ, such as the difficulty of properly dispersing the larger quantities of water, the treatability of the dispersions that are formed, the characteristics of the electric treating process which is used, the character of the equipment employed, and, as an absolute upper limit, the necessity of forming and maintaining an oil-continuous dispersion rather than a water-continuous dispersion since the latter type of dispersion cannot be electrically treated. Again, external limitations may be imposed by the amount of available fresh or relatively pure water and, hence, upon the degree of purification obtainable by the above-described process.

It is an object of the present invention to provide an improved process of the kind described which permits the attainment of a substantially higher degree of purification than hitherto possible.

It is also an object of the present invention to provide a process of the kind described which is characterized by a much greater efficiency of purification relative to the amount of water employed than heretofore obtainable.

It is also an object of the invention to provide improvements in such processes which permit the realization of substantial purification even with very limited quantities of water or with the use of water that is rather impure.

According to the present invention, an oil containing dispersed saline material may be subjected to a plurality of alternate dispersion and electric resolution steps with or without specific further use of the dilute brines separated in the electric resolution steps. Also, in accordance with the present invention, water may be subjected to successive re-use in forming the required secondary dispersed phase, with a gradual increase in its concentration in the impurities being removed from the oil, or the concentration of such impurities may be kept constant by suitable dilution with fresh water.

Further objects and aspects of the invention will be apparent from the following description of the process, which is made with particular reference to the drawing in which:

Figure 1 is a schematic representation of the flow diagram used in one embodiment of my invention, hereinafter referred to as the multiple extraction process.

Figure 2 is a schematic representation of the flow diagram used in another embodiment of my invention, hereinafter referred to as the counter-current extraction process.

Figure 3 is a schematic representation of the flow diagram used in another embodiment of my invention, hereinafter referred to as the concurrent extraction process.

Figure 4 is a more or less schematic representation of a vertical section of an electric treater suitable for use in my process.

Referring more particularly to Figure 1, the embodiment there shown is illustrative of a method for multiple extraction in which a given quantity of water is suitably apportioned, and the portions thereof successively dispersed in the oil stream, with intervening treatment and resolution of the dispersions thus formed. In general, the process of multiple extraction will require at least two successive dispersion steps corresponding to the two or more portions into which it is desired to divide the water. Figure 1 has been illustrated with reference to a process using three such steps.

In Figure 1, relatively fresh water is brought from a suitable source and passed by means of pump 8 into header 7. This water is split into three streams by means of pipes 13, 23, and 33, the relative quantities thereof being controlled by valves 14, 24, and 34, respectively. These three streams of water are introduced into a flowing stream of oil at points 15, 25, and 35, and the dispersions formed thereat, or thereafter in mixing valves 12, 22, and 32, are subsequently resolved in treaters 10, 20, and 30. These treaters are preferably electric, such as the type illustrated in Figure 4, which resolve the dispersion and cause it to separate therein, or thereafter, into a layer predominantly oil and a layer predominantly water.

The sequence of the procedural steps is most conveniently discussed from the standpoint of the continuity of the oil stream. Oil containing undesirable water-dispersible impurities dispersed therein is pumped into the system through a pipe 6 by means of a pump 11. At juncture 15, it is admixed with the portion of water flowing through the pipe 13. Frequently, the water thus introduced becomes dispersed to the desired degree simply by injection and by the turbulence of the flowing stream. In other instances, it is advisable to provide additional and controlled turbulence, as by passing the mixture through mixing valve 12, which may suitably be of the weight-loaded type. The dispersion may also comprise certain chemicals or modifying agents, as disclosed more fully hereinafter, which may be introduced into the oil stream, water stream, or stream of dispersion by means of valved inlet pipes 41, 42, or 43. The dispersion thus formed is next conducted into the treater 10 wherein it is caused to stratify into an upper layer predominantly oil and a lower layer predominantly water. As stated above, this resolution may be accomplished by the action of an electric field adapted to induce at least partial coalescence of the dispersed phases.

Although, in general, a substantial degree of resolution and stratification is contemplated as taking place in the treater 10, it is not essential for the practice of my process that this separation be complete. For example, the oil removed from the upper layer in the treater 10 through the pipe 16 and valve 17 may comprise substantial amounts of dispersed water, and, in fact, may be even wetter than the original oil, in some instances. It is contemplated, however, that the oil thus removed will have been at least partially relieved of its original content of water-soluble or water-wettable impurities.

Water is withdrawn from the bottom of the treater 10 through a pipe 19 and valve 18 and passed into a header 40. In many instances, this water bleed will be substantially clean, i. e., free from oil, but, in other instances, the bleed may comprise certain quantities of oil in the form of dispersed oil droplets, clusters of sludge or coarse emulsion, and the like. Where the bleed contains sufficient quantities of oil to make the recovery thereof profitable, or where it is necessary to have clean water for discharging to waste, the effluent water, as collected in the header 40, may be subjected to further suitable treatment, as by settling to obtain clear water and an oily emulsion, and recycling the latter with the incoming oil.

In many instances, it is highly advantageous to recycle a portion of the effluent water, that is, not to discharge all of the effluent water directly but to divert a portion thereof for admixture with the relatively fresh water used in forming the dispersion to become a part thereof. Improved efficiency and treatability may frequently be had by thus modifying the available fresh water, which I believe to be due, in part at least, to the presence in the effluent water of counter-emulsifying agents extracted from the oil, presently to be discussed at greater length. Provision for recycling a portion of the effluent water from the first treater is afforded by a pipe 19a by means of which a pump 19b may transfer effluent water from pipe 19 to fresh water pipe 13.

As much as 50% or more of the effluent water may frequently be advantageously recycled through the first treater. Subsequent treaters may similarly be equipped for recycling, although, as a rule, the advantage of recycling will be most evident in the first treater since the dispersions formed in subsequent treaters are usually more amenable to electric treatment even when recycling is not used. While, in the embodiment shown, the recycled aqueous phase is derived from the effluent of the first treater, it may, if desired, be obtained from the effluent water from subsequent treaters, or from the combined effluent water from all of the treaters. I have also found that such partial recycling of effluent water is a very useful expedient in connection with a single stage extraction process.

The partially purified oil issuing through the line 16 may be conducted through the next stage of treatment under its own pressure, or may be re-pressured by means of a booster pump 21. The oil flowing through the line 16 receives the stream of water flowing through the pipe 23 at the point 25, and the latter is dispersed in the oil by the turbulence of injection or flow and/or the action of the mixing valve 22. Any desired chemicals may be added to the oil stream, water stream, or stream of dispersion through valved inlet pipes 44, 45, or 46, respectively. The dispersion formed in this second dispersion stage is then conducted into the treater 20 and is there resolved into an upper layer of still further purified oil and a lower layer which is predominantly aqueous in character and which carries the extracted impurities as a dilute dispersion or solution thereof in the water. The aqueous phase is bled from the treater 20 by means of a pipe 28 and valve 29 into the header 40. The still further purified oil containing more or less water is conducted through a pipe 26 and valve 27 to the succeeding dispersion stage, being re-pressured, if desired, by a booster pump 31.

The oil flowing through the pipe 26 receives its final admixture with water at the point 35 and flows through the mixing valve 32, if used, and to the treater 30. The formation of the dispersion and its subsequent resolution in the treater 30 are substantially as described above and, again, suitable modifying agents may be added through pipes 47, 48, or 49.

The treating and separating actions occurring in the treater 30 will, in general, be controlled to give a treated oil, removed through a pipe 36 and valve 37, having a water content within the desired range and, in many instances, it will be desired to reduced this water content to a minimum to increase the extraction efficiency. This treated oil is further characterized by having a very substantially reduced content of water-dispersible impurities, as compared with the original impure oil. Water and associated impurities are bled from the treater 30, with or without entrained oil, through a pipe 38 and valve 39 into the header 40.

One of the paramount advantages accruing from the use of this process is the greatly increased efficiency, so that relatively small quantities of water may be used to obtain very high degrees of purification. This increased efficiency is strikingly apparent even when only two stages are used instead of the three as shown in Figure 1. For example, when operating on a crude petroleum containing about 1% of brine and having a salt content of 77.4 pounds/1000 bbls., a single stage treatment with 20% of fresh water reduced the salt content in the treated oil to only 8.4 pounds/1000 bbls. On the other hand, a slightly less quantity of water, namely 18.7%, apportioned as 10% and 8.7% in the first and second dispersions respectively, gave a final salt content of only 0.35 pound/1000 bbls., or approximately 1/24 the salt content of the oil treated in the single stage process. When approximately 20% of water was used in each of the extraction steps in the dual extraction process, the salt content of the oil issuing from the second step was nil, according to the regular analytical procedure.

Not only does the process show very greatly improved results as regards the efficiency of extraction with a given quantity of water, but also a degree of purification may be obtained which it is impossible to realize under any conditions in the single stage process. As was pointed out above, the degree of salt removal obtainable in the single stage process is a function of the amount of water dispersed in the oil but, for various practical reasons, this dependency of the degree of salt removal on the quantity of water employed is not linear and falls off rapidly as the quantity of water is increased much beyond 20% to 25%. Furthermore, it is impossible to thus utilize much more than 50% or 60% of water due to the inability to obtain oil-continuous dispersions at higher percentages, it being necessary for electric treatment to have the oil as the continuous phase. In fact, the upper limit in commercial usage is usually considerably lower than this, being fixed by factors of treatability and the like. However, a curve may be plotted showing the variation in salt removal with the amount of water used within the operable region and extrapolated to give an indication of the amount of water which it would be necessary to use in a single stage process to approach the degree of refining obtained in the dual or triple stage extraction process. On this basis, it is found that 25% of water used in two 12½% portions in a dual stage extraction process achieves purification results corresponding to the results hypothetically obtainable by the use of 200% of water with the single extraction method, and that triple extraction with 25% of water, divided into three equal portions of 8⅓% each, achieves refining results which would be obtainable only by the use of about 900% of water in a single stage extraction process. These figures are significant in showing more than just the relatively greater efficiency of the multiple extraction process, for they show that the results achieved thereby would require impossible conditions for their attainment in the single stage process.

One feature of the process is thus seen to be the ability to produce very high degrees of purification. For example, when operating on a crude oil containing salt dispersed therein as brine or otherwise, the residual salt content of the treated oil may be maintained at very low levels. This is very important in many plants where it has been found that serious corrosion and clogging difficulties are encountered in handling oil which contains salt, even though the concentration thereof may not exceed a few pounds per thousand barrels.

On the other hand, the quantity of fresh water available is frequently limited and, in other instances, may be obtained only at such cost as to make its use a serious economic problem, particularly when it is found advisable to treat or modify the water by the addition of chemical agents, and, in these circumstances, economy in the use of water becomes one of the chief advantages of my process.

In addition to the advantages arising directly from reduction in the quantity of water required, various other advantages are resident in the conservation of water which it is possible to make by employing my process. In particular, a decrease in the quantity of water decreases the total quantity of wet oil or oil containing the secondary dispersion that is flowing through the system and, hence, in effect, increases the capacity of the treater, pumps, heating equipment, and the like, and, hence, the plant as a whole will display substantially increased capacity and efficiency arising from a reduction in the total quantity of water employed. Also, economy in the use of water reduces and simplifies the problem of disposal of the contaminated effluent water.

While the degree of purification obtainable increases with the number of extraction stages used, two stages will usually suffice to give very marked improvements of the kind described. The further refinement of additional stages is usually not necessary in commercial practice, although it may be found advantageous in certain instances. With many types of electric treaters, resolution and separation of the phases are not readily obtainable when the water content falls below a certain minimum percentage. Under such circumstances, and if only a limited amount of water is available, the number of extraction stages should not be unduly multiplied, since the portion of water set aside for each stage might thereby be reduced below the minimum necessary for good treating efficiency.

Excellent results may be obtained by so apportioning the water that from 7% to 8%, up to 20% or 25%, of water is dispersed in each stage. In many instances, this range may be considerably broadened, depending upon the kind of oil being treated, the character of the electric treating and separating equipment, the type of impurity which it is desired to remove, and the like. As mentioned above, some electric treaters operate efficiently only when a certain minimum quantity of water is exceeded and, frequently, the treater will be found to operate most efficiently on oils having water contents within certain optimum ranges. The flexibility of the treating system is such that, if desired, the quantity of water dispersed in each stage may be such as to give optimum operating conditions for the treater associated therewith. In general, however, the degree of desalting or impurity extration accomplished in the multiple extraction process is much less affected by any variations in quantity of the water supplied, either to the system as a whole or to the individual units, than is a single stage system.

When recycling of water is employed in connection with any given stage, the indicated proportions of fresh water may be substantially reduced, if desired, since the optimum water content for treating may be derived in part from recycled water.

The process may be operated with various water contents of the initial, intermediate, and final oil. For example, the initial oil may be substantially dry, in which case the water-dispersible impurities may be dissolved in the oil or dispersed therein in the form of minute crystals, or it may contain substantial quantities of water or brine, for example, up to 8% and higher. The original dispersed aqueous phase may contain all of the undesired impurities in the form of a brine solution, or there may be coexisting crystalline or solid dispersoids. The process operates to very excellent advantage on dehydrated crude oils which contain from about 1% to 5% of water in the form of the original oil-field brine, or on oils of similar water content derived from other sources.

The operation of the individual electric treaters may be such as to give an effluent oil having less, the same, or more water than was associated with the original oil, provided that sufficient impurity extraction has been accomplished to give an oil of desired character. The final treater, however, is usually adjusted to give a low cut or water content, for example 1% or less, or whatever is required to meet the specifications of the treated oil.

In practice, I frequently find it advantageous to operate the treaters so that the cut of the intermediate and final oils is from about ½% to 3%, which will also be the usual range for the cut of the impure oil. The water content of the oil may thus be maintained approximately constant except for the periods intervening between the addition and separation of water, although within this range there also may be a progressive decrease in cut as the oil becomes more purified.

In practice, it is usually found that the final treater or treaters produce quite low cuts without difficulty, substantially lower than the first treater or the single treater of the single stage process. Another distinct advantage of the multiple extraction process is that it yields a very easily treatable dispersion for final treatment, thus facilitating the production of quite dry, low cut oils while decreasing the expenditure necessary in electricity or chemicals to a value substantially lower than that required to produce a similar low cut in a single stage process.

Associated with the increased treatability of the oil in the latter stages, I also find a decreased tendency to form sludge. By the term "sludge," I have reference to that coarse grained emulsion which frequently collects in an unresolved state at the oil-water interface in electric dehydrating vessels. This relative freedom from sludge constitutes another important advantage resident in my process.

The increased treatability of the oil in the intermediate and final stages is indicative that the character thereof has been modified other than by partial extraction of its salt content. This modification may possibly be due to the increasing complexity of the dispersed phase. Thus, the first treater receives an oil containing a dispersed phase largely consisting of two types, namely, the original dispersion and the added droplets of relatively fresh water. Subsequent to the resolution thereof, as in the oil passing to the second stage, the dispersed phase in the oil consists of a residual quantity of the original dispersed phase, droplets of uncoalesced added water, and droplets of varying, but dilute, concentration that have arisen from coalescence of the added and original droplets. The dispersion of further relatively fresh water in the oil in the second stage therefore leads to a dispersed phase consisting at least of three types of droplets: original, dilute, and relatively fresh; and, hence, the dispersion may be said to be more complex or heterogeneous than in the first instance. It is evident that this complexity will increase from stage to stage. The effect of heterogeneity in particle size, or in particle kind, has been studied to a certain extent and it has been found that increasing heterogeneity results in increased treatability when resolution is accomplished by the action of an electric field. The production of dispersions having an increasingly complex dispersed phase is of even greater importance in the countercurrent and concurrent processes presently to be described, in which each dispersion stage receives an added water of different concentration in impurities.

I do not wish to be bound by any theoretical explanation of the observed effect, however, particularly since I have ascertained that other factors are also involved. I have found, for example, that the oil becomes appreciably depleted in natural emulsifying agents of the kind promoting water-in-oil emulsions as it progresses through the successive extraction stages so that the resolution of such emulsions or dispersions becomes progressively easier. I have also found that the aqueous phase used to contact the oil becomes enriched in counter-emulsifying agents, i. e., agents adapted to promote oil-in-water emulsions, so that the re-dispersion of such an enriched aqueous phase in oil gives a more easily treatable dispersion than was obtained initially. Examples of re-use of the effluent water in this capacity are afforded by the recycle system described in connection with the first treater of the multiple extraction process, and by the countercurrent and concurrent extraction systems presently to be described. I believe that these phenomena are dependent upon the conversion of emulsifying materials from an oil-dispersible state in which they tend to stabilize oil-continuous emulsions to a water-dispersible state in which they tend to stabilize water-continuous emulsions. As an example, oil-soluble organic acids stabilizing oil-continuous emulsions may be transferred by this process to an alkaline aqueous phase in which they exist as water-soluble or water-dispersible soaps stabilizing water-continuous emulsions.

Similar effects are also observed with relatively fresh water that contains no alkali, and it is inferred that certain emulsifying agents in the oil are potentially water-soluble or water-dispersible, and that, becoming wet or dissolved by the water introduced in the process, these agents display in their final aqueous environment an emulsifying tendency opposite or antagonistic to that displayed in their original oil environment. The solubility or dispersibility of these agents in the strong brine originally associated with the oil is apparently very small since I have found that it is only upon the introduction of relatively fresh water or dilute brine solutions that the transfer of these agents to the aqueous phase becomes appreciable. There are also certain indications that this transfer or extraction of emulsifying agents is greatly facilitated, or indeed made possible, by some action of the electric field used to treat the dispersion of water in oil, although the precise mechanism of this action is at present unknown. These and other factors doubtless contribute to the observed increase in treatability of dispersions containing oil which has been previously extracted or containing water which consists, in part, of aqueous extract obtained from another extraction.

Reference has been made to the introduction of chemicals into the oil or water stream prior to dispersion, or into the dispersion subsequent to its formation. It has been found that, in many instances, the efficiency of the desalting process may be increased by proper control of the pH of the aqueous phase, by neutralizing excess acidity in the oil, and by conditioning the interfaces by means of certain surface active compounds, such as de-emulsifying agents. In the present connection, I have ascertained that it is frequently advantageous to maintain different conditions in the different treaters or different stages of the process as regards pH of the aqueous phase, destabilization of the interfaces, and the like. I have correspondingly provided for the introduction of suitable agents of the type described to each stage separately as may be required.

While the multiple extraction process illustrated in Figure 1 has been described with particular reference to its application in the removal of salt and brine from crude oils, it may be advantageously employed in general for the removal of water-dispersible impurities present in oil in a dispersed or dissolved form. In at least most instances, these dispersed water-dispersible impurities are inorganic in character and, in many instances, will be present in the form of a dispersed concentrated aqueous solution. For example, I have found that my process is excellently adapted for the removal of acidic or alkaline reagents used in refining petroleum distillates, or for the removal of salts arising in neutralization steps as practiced in refining.

Referring to Figure 2, a countercurrent process is there-illustrated which exhibits to an even higher degree the increased efficiency, economy, and power of purification displayed by the multiple extraction process of Figure 1. In addition, certain unique advantages are resident in the countercurrent process which are found neither in the single stage process nor in the multiple extraction process. In the countercurrent process, slightly brackish or otherwise impure water derived from other parts of the system is used in the first extraction stages, and the available relatively fresh water is introduced into the system only in the last stage in which the final purified oil is produced. Referring to Figure 2, the numerals 70, 80, and 90 indicate treaters or separators corresponding to those shown in Figure 1. The oil flow also corresponds to that shown in Figure 1. The entire quantity of available relatively fresh water to be used, however, is introduced by means of a pump 101 and pipe 100 into the oil stream flowing through a pipe 85 to the last stage of treatment, the oil and water being admixed at the juncture 93. The water is dispersed in the oil by the turbulence of the stream and/or by the action of a mixing valve 94 and discharged into the treater 90. In this treater 90, a substantial resolution of the dispersion is caused to take place, followed by stratification into an upper layer of relatively dry oil and a lower layer predominantly aqueous in character. The treated oil is taken from the top layer through a pipe 95 and valve 96, and such treatment and separation is effected as to meet the required specifications on the water content of the treated oil.

The water, or predominantly aqueous phase, is withdrawn from the bottom of the treater 90 through a pipe 97 and valve 98, and, with or without being re-pressured by a booster pump 99, is introduced into the stream of oil flowing toward the preceding treater 80. This introduction takes place at the juncture 83 and the water and oil thereafter flowing through a pipe 75 are caused to form an oil-continuous dispersion, if necessary by the aid of a mixing valve 84. This dispersion is similarly resolved in the treater 80, the partly treated oil being taken off the top through the pipe 85 and valve 86 and water, or a predominantly aqueous phase, being removed through a pipe 87 from the bottom of the treater 80.

Pressure differentials between the treaters 80 and 90, or between any other two adjoining treaters, may be maintained such that either the oil stream or the water stream will flow in response to said differentials, in which case the countercurrent stream is moved by the action of the appropriate booster pump. In some instances, however, booster pumps may be used on both streams. In general, I find it preferable to pump the water stream since mechanical agitation of any associated sludge is thereby afforded which frequently aids in the resolution of the sludge emulsion.

The treatment in the treater 80 need not be such as to produce an oil having the same low water content as delivered from the treater 90, but, on the other hand, the separation in the treater 80 should not be so deficient as to increase the water content of the oil stream passing from this treater 80 to the treater 90 to the extent that the operating characteristics of the latter are impaired to prevent meeting the desired cut therefrom. Again, substantial quantities of oil may be recycled from the treater 90 back to the treater 80 along with the water stream flowing through the pipe 97, either as dispersed oil, sludge, or the like, without seriously interfering with the process unless the quantity of recycled oil is increased to a point where it seriously impairs the desired oil-water ratios in the dispersion and separating zones. However, it should be noted that excessive carry-over either of water in an oil stream or of oil in a water stream tends to drop the extracting efficiency of the system to a value less than its maximum, and, where possible, a relatively clean separation of oil and water should be maintained in the treaters in order to insure maximum efficiency. As in the case of multiple extraction, the cuts on the oils flowing between treaters may be very advantageously kept between about ½% and 3%, thus corresponding roughly to the cuts of the initial impure oil and the final treated oil.

The water, or predominantly aqueous layer, bled from the bottom of the treater 80 through the pipe 87 is passed through a valve 88, repressured, if necessary, by a pump 89, and introduced into the initial (or original) impure oil stream flowing through the pipe 71 at the juncture 73. A dispersion formed thereat, or thereafter in mixing valve 74, is resolved or partially resolved in the treater 70, and the oil layer at the top is removed through the pipe 75 and valve 76. The water, or predominantly aqueous layer, formed in the bottom of the treater 70 is bled to waste through the pipe 77 and valve 78, or, if it is found to contain appreciable values in oil, it may be subjected to further treatment, e. g., by returning it to the first or intermediate treaters in the process.

As was described in connection with Figure 1, it is frequently advantageous to introduce chemicals, modifying agents, pH controlling chemicals, and the like into each extraction zone separately, preferably either to the oil stream or water stream flowing to said zone or to the dispersion after it has been formed in that zone. Valved inlet pipes 110—118 have been shown in Figure 2 to indicate such optional additions.

In all instances, the relative rates of countercurrent oil and water flow between the extraction zones are controlled by the valves indicated on these streams to maintain the desired interfacial levels in the treaters.

In the operation of this countercurrent process in desalting, the first desalting step is conducted with relatively fresh water having an appreciable, although dilute, content of brine or other water-soluble or dispersible impurities extracted in the succeeding stages. This somewhat brackish water, however, is highly effective in reducing the salt content of the oil from a very high level to an intermediate level, since its salt content is still only a fraction of that of the brine in the oil. In the intermediate stage, a relatively fresh water comprising a somewhat more dilute brine is used to bring the salt content of the oil from an intermediate level to a relatively low level and, in the final stage, the available relatively fresh water is used to bring the salt content of the oil from a relatively low level to the very small residual content in salt that is required in order to meet the specifications. By this means, the extracting efficiency of a given quantity of water is displayed in its maximum degree, and even greater economy in the use of water, or even greater salt reductions from the use of a given quantity of water, are obtainable by this countercurrent process than were disclosed above in connection with the multiple extraction process.

The countercurrent process thus permits a large decrease in total water requirements and at the same time effects a marked increase in percentage removal of impurities. Furthermore, the treatability of the dispersions formed in the process is greatly improved in comparison with the treatability of dispersions formed by prior practice, since the enriched water used in the first stages contains substantial quantities of counteremulsifying agents extracted from the oil, and the oil processed in the final stages has had a substantial proportion of natural emulsifying agents removed therefrom.

Another advantage resident in the countercurrent process is that the multiplication of stages for obtaining increased efficiency of purification does not necessitate the splitting of the water stream into correspondingly smaller portions, so that a relatively small quantity of water may be used in connection with two, three, or even more stages without decreasing the ratio of water to oil in any of the stages, and recycling for the purpose of maintaining an optimum water content is unnecessary.

The efficiency of the countercurrent process is such that, in practice, it will rarely be found necessary to use more than two stages in order to accomplish any desired degree of purification. The quantity of water used may be varied within any desired limits but, in general, should be such as to lie within the optimum operating region of the particular type of treating system used. Excellent results are obtained in connection with the use of the electrical treaters shown in Figure 4 when employing from 10% to 25% of water based on the volume of the oil, though the invention is not limited thereto and, in some instances, for example, from 5% to 40% of water may be advantageously employed.

The character of the water used, that is, its initial content in salt or other impurities which it is desired to remove from the oil, may not exceed certain limits, but the efficiency of my process is such that substantially more brackish water may be utilized than in the case of single stage treatment. The limit of undesired impurities which can be tolerated in the water supply is fixed by the requirement that an oil, which has been purified to the extent that it contains practically none of the original dispersion and, therefore, has as its residual water content substantially only a dispersion of the added water, should not, as a result of the quantity of residual water carried by that oil and the concentration of impurities therein, have a total content in salts or other undesired impurities exceeding the specified limits. Thus, in desalting, the salinity of the added water should not exceed the tolerable salinity of the residual dispersed phase in the final oil. In practice, I find it advisable to use a supply of relatively fresh water having a lower concentration in the undesired impurities than corresponds to the above limiting value.

The limits discussed immediately above apply to the final treater and to the water introduced directly thereto. It is obvious, however, that, in preceding treaters which in normal operation are producing oil of substantially higher salt content than the final treater, a considerably greater salt content in the water may be tolerated. This is exemplified by the increasing concentration in salt or other undesired impurities of the water successively dispersed in the last, intermediate, and first stages of the countercurrent extraction process. In view of the replacement phenomena observed in this type of process and which have been hitherto adverted to, it is evident that some degree of desalting and purification will be obtained in any given stage provided the water dispersed in the oil has a lower concentration in the undesired impurities than corresponds to the average concentration of these impurities in the dispersed aqueous phase in the oil being subjected to treatment in that particular stage. In general, however, the most satisfactory purification in a given extraction stage will not be realized unless the water dispersed therein is substantially less concentrated in the undesired impurities than the dispersed phase which it is desired to replace.

The relationship between the salinity of the dispersed brine and the added water and their effect on the salt content of the final oil may be exemplified with reference to a single stage treatment in which an oil containing 150 pounds of salt per 1000 barrels (150 p. t. b.) in the form of brine amounting to 0.3% by volume of the salty oil was treated with 10% by volume of added water, the water content of the purified oil being maintained at 0.2%. When the added water contained no salt, the salt content of the treated oil was 10.3 p. t. b. When the added water had a salinity 5.13% of that of the dispersed brine, the treated oil was found to contain 15 p. t. b. of salt. When the salinity of the added water was 15.65% of that of the brine, the treated oil contained 25 p. t. b. of salt. These figures relate only to a single stage treatment and substantially greater salt reductions for a given quantity of added water may be achieved in any of my multistage processes. They serve to illustrate, however, the practicality of using relatively brackish water in the first stage of my process in which a relatively high salt content in the treated oil may be tolerated, and also to indicate the advisability of maintaining the salinity of the water added in the final stages below certain maximum values in order to obtain a treated oil having a salt content below a specified limit.

I have further made an unexpected discovery that the water, or predominantly aqueous phase, withdrawn from the bottom of a treater is not only able to accomplish further refining of a more impure oil as, for example, oil entering a preceding stage in the countercurrent process but, in many instances, it is also adapted to effect further purification of oil flowing from the same treater.

An embodiment illustrating the application of this discovery is shown in Figure 3. The process there-illustrated I term "concurrent extraction." This concurrent extraction comprises the use of two or more extraction zones, in the first of which water is dispersed in the oil and then at least partially resolved to obtain an oily layer and an aqueous layer which are separated and again re-admixed in a second extraction zone for re-dispersion and re-separation. The impure oil is picked up by a pump 152 and passed through a pipe 151 past the juncture 153, at which point it is admixed with relatively fresh water, that is, water containing less impurities than the water initially associated with the oil. Water is brought to the juncture 153 through a pipe 161 and a valve 160 by a pump 162 connected with a suitable source by means of a pipe 159. The mixture of water and oil obtained at the juncture 153 is formed into a dispersion by means of the subsequent flow through the pipe 151 and/or the action of the mixing valve 154. The dispersion thus obtained is discharged into an electric treater 150, such as shown in Figure 4, wherein at least a partial resolution into an oily layer and an aqueous layer is obtained. This separation may either be substantially complete so that a substantially dry oil, e. g., having a cut of about ½% to 3%, is withdrawn through the pipe 155 and substantially clean water is withdrawn through the pipe 157, or, in some instances, it may be only a partial resolution such that the upper and lower layers are distinguished by their lesser and greater content of water, respectively, and/or by being, respectively, oil-continuous and water-continuous. The material withdrawn from the top of the treater 150 through pipe 155 passes through a valve 156 and is re-pressured, if desired, by a pump 172. The material withdrawn from the bottom of the treater 150 by means of pipe 157 is passed through a valve 163 and a pipe 164 and re-pressured, if desired, by the booster pump 165.

A portion of the effluent water withdrawn through pipe 157 may be recycled, if desired, by means of a pipe 157a and a pump 157b. Also, if desired, the effluent in pipe 157 may be somewhat diluted with fresh water by opening a valve 160a and allowing a part of the fresh water discharged from the pump 162 to commingle with the effluent from pipe 157 in pipe 164. In case it is not desired to use all the effluent from the first treater in the second extraction zone, a portion thereof may be bled to waste by means of a valve 167. The water discharged by the pump 165 is conducted through a pipe 166 to the point of juncture 173 where it is mixed with the oil flowing through the pipe 155. A dispersion is obtained thereat, or thereafter in a mixing valve 174, and the dispersion passes into the treater 170. Here, a substantial resolution into oil and aqueous phases is caused to take place, with stratification into an upper and lower layer of purified oil and water respectively, the water content of the purified oil being reduced sufficiently for the purposes at hand, and this oil being withdrawn through pipe 175 and valve 176. This purified oil is characterized by a very substantially reduced content in salt or other water-soluble or water-wettable impurities as compared with the initial oil. Water, or a predominantly aqueous phase, containing the extracted brine and other water-dispersible impurities is withdrawn from the treater 170 by means of a pipe 177 and valve 178. Suitable modifying agents may be added by means of valved inlet lines 190 to 195, respectively, as previously described.

When the first treater 150 is efficiently operated so that there is a substantial resolution into dry oil and clean water in the treater 150, a substantial reduction in salt content is observed for the oil issuing from the treater 150, as compared with the initial oil. However, very significant further reductions in the salt content are obtained in the second treater 170 using the separated water from the treater 150, as shown in Figure 3. For example, a concurrent extraction system was operated on an oil containing 218 pounds of salt per 1000 barrels and having a 1% cut, i. e., containing 1% of water or brine. The electric treaters produced in each stage an effluent oil containing only 1.1% water. The salt content of the oil issuing from the first stage was 43 pounds per 1000 barrels, and this was reduced to a value of only 26 pounds per 1000 barrels on passage through the second treater. In another instance, the same system was used to treat an oil containing 276 pounds of salt per 1000 barrels of oil containing 0.8% water. The first treater produced an oil containing 2.4% of water and 79 pounds of salt per 1000 barrels. The second treater effected a further reduction to 35 pounds of salt per 1000 barrels in the effluent oil which contained 1.9% of water. In both instances, the original water had been treated with caustic soda to a pH of about 10, and the pH of the water bled from the first and second treaters, respectively, was found to be 8.5 and 8.0.

As I have indicated, I prefer, in general, to use electric treaters as separators, although, in some instances, other types of separators may be used. Figure 4 illustrates an electric treater which I have found very suitable for this purpose and which provides a means for the subjection of the incoming dispersion or emulsion to the action of an electric field resident between vertically spaced energized electrodes. A more detailed description of this specific type of electrical treater and its mode of action may be found in the patent to Harold C. Eddy, No. 2,182,145, issued December 5, 1939. It will be suffice here to state that such a treater is highly effective for the purpose since the action of the electric field on the dispersion or emulsion serves to coalesce the dispersed phase and alter it sufficiently so as that it separates more or less completely into continuous oily and aqueous phases.

As indicated above, the term "water-dispersible impurities" has been used in the specification and claims to signify, in general, any impurity which becomes associated with, and dispersed in, the water in the practice of the process, and is thereby removed from the oil in association with the separated water. Such impurities may comprise solid particles which become wetted by the water to form a mechanical or colloidal suspension therein, e. g., sand, silt, and the like, and may also include impurities which become molecularly or ionically dispersed in the water, namely, the water-soluble impurities, e. g., salt, inorganic acids, etc.

The term "relatively fresh water" is employed to signify a water in liquid state when added to the oil and having a sufficiently low concentration in the impurities which it is desired to remove to be effective in purifying the oil; for example, a water substantially less concentrated in impurities than corresponds to the average concentration of the impurities in the dispersed aqueous phase of the oil being treated.

It is to be understood that the details which have been introduced for the purpose of the above description of specific embodiments of my invention are illustrative rather than limiting and are not restrictive on the scope of the appended claims.

I claim as my invention:

1. A process for treating a mineral oil containing no more than a few per cent of water, said oil containing naturally-occurring emulsifying agents tending to stabilize oil-continuous emulsions and said oil containing water-dispersible impurities, the process being adapted to reduce to a desired extent the amount of such impurities, which process includes the steps of: subjecting said oil to successive dispersing steps each followed by a treating-separating step, each dispersing step comprising dispersing water into the oil, which water is sufficiently fresh to extract impurities from the oil and each dispersing step being conducted in such manner as to form a dispersion containing droplets of the added water existing separately from impurities, and each treating-separating step including subjection of the resulting dispersion to the action of an electric field of sufficient intensity to coalesce the aqueous phase and cause impurities to become associated therewith, each treating-separating step including also the separation of the coalesced aqueous phase containing the associated impurities to produce an oil containing a residual quantity of water, whereby the oil resulting from the first treating-separating step and as modified by treatment in the electric field of said first treating-separating step is subsequently subjected to another dispersing step followed by another treating-separating step.

2. A process for treating a mineral oil to remove saline impurities therefrom, said oil containing dispersed aqueous droplets in which saline impurities are dissolved, said oil containing no more than a few per cent of water and containing naturally-occurring emulsifying agents tending to stabilize oil-continuous emulsions, which process includes the steps of: subjecting said oil to successive dispersing steps each followed by a treating-separating step, each dispersing step comprising dispersing into the oil, water substantially less concentrated in said saline impurities than are said dispersed aqueous droplets of said oil, each dispersing step being performed in such manner as to form a dispersion containing droplets of added water existing separately from dispersed aqueous droplets in which saline impurities are dissolved, and each treating-separating step including the subjection of the resulting dispersion to the action of an electric field of sufficient intensity to coalesce droplets of the added water with dispersed aqueous droplets containing dissolved saline impurities, each treating-separating step including also the separation of the coalesced aqueous material to produce an oil containing a residual quantity of water, whereby the oil resulting from the first treating-separating step and as modified by treatment in the electric field of said first treating-separating step is subsequently subjected to another dispersing step followed by another treating-separating step.

3. A process as defined in claim 1, in which the water dispersed into the oil in at least one of the dispersing steps comprises coalesced aqueous-phase material separated in one of the treating-separating steps.

4. A process as defined in claim 1, in which the water dispersed into the oil in the first dispersing step comprises coalesced aqueous-phase material separated in a later treating-separating step.

5. A process as defined in claim 1, in which the water dispersed into the oil in the first dispersing step comprises coalesced aqueous-phase material separated in a subsequent treating-separating step, and in which the water added in said first dispersing step has a larger concentration in the impurities than does the water dispersed into the oil in the dispersing step immediately following the first treating-separating step.

6. A process as defined in claim 1, in which the coalesced aqueous phase separated in one of said treating-separating steps is re-used bodily as the water dispersed into the oil in a dispersing step preceding another of said treating-separating steps.

7. A process as defined in claim 1, in which said oil is characterized by being capable of extraction by relatively fresh water to form counter-emulsifying agents in the extract, said counter-emulsifying agents being of the type adapted to promote oil-in-water emulsions, and in which such relatively fresh water is dispersed into the oil in one of said dispersing steps whereby the coalesced aqueous phase separating in the immediately succeeding treating-separating step contains such counter-emulsifying agents, and in which this coalesced aqueous phase is employed at least in part as the water dispersed into the oil in another of said dispersing steps.

8. A process as defined in claim 1, in which the dispersing and treating-separating steps are so performed that the residual water content of the oil resulting from the first treating-separating step is higher than the water content of the incoming impure oil subjected to the first dispersing step, and the residual water content of the oil resulting from the last treating-separating step is lower than the residual water content of the oil resulting from the first treating-separating step.

9. A process as defined in claim 1, in which the water dispersed into the oil in the first dispersing step is a relatively fresh water, and in which the water subsequently dispersed into the oil separated in the first treating-separating step comprises said coalesced aqueous phase separated in this first treating-separating step.

10. A process for treating a mineral oil containing no more than a few per cent of water, said oil containing naturally-occurring emulsifying agents tending to stabilize oil-continuous emulsions and said oil containing water-dispersible impurities, the process being adapted to remove to a desired extent the water-dispersible impurities, which process includes the steps of: subjecting said oil to first and second dispersing steps respectively followed by first and second treating-separating steps, each dispersing step comprising dispersing water into the oil and each dispersing step being performed in such manner as to form an oil-continuous dispersion containing droplets of the water added in this dispersing step existing separately from impurities, and each treating-separating step including subjection of the resulting dispersion to the action of an electric field of sufficient intensity to coalesce the aqueous phase and cause impurities to become associated therewith, each treating-separating step including also the separation of the coalesced aqueous phase containing the associated impurities to produce an oil of reduced impurity content containing a residual quantity of water, the oil resulting from the first treating-separating step and as modified by treatment in the electric field of said first treating-separating step being subjected to said second dispersing step, the water dispersed into the oil in said second dispersing step having a sufficiently low concentration in said impurities to remove in said second treating-separating step a further amount of impurities from the oil resulting from the first treating-separating step and the water dispersed into the oil in said first dispersing step comprising coalesced aqueous-phase material separating in said second treating-separating step.

11. A process for treating a mineral oil to remove saline impurities therefrom, said oil containing dispersed brine droplets in which saline impurities are dissolved, said oil containing no more than a few per cent of water and containing naturally-occurring emulsifying agents tending to stabilize oil-continuous emulsions, which process includes the steps of: subjecting said oil to first and second dispersing steps respectively followed by first and second treating-separating steps, each dispersing step comprising dispersing water into the oil and each dispersing step being performed in such manner as to form an oil-continuous dispersion containing droplets of the water added in this dispersing step existing separately from dispersed brine droplets, and each treating-separating step including subjection of the resulting dispersion to the action of an electric field of sufficient intensity to coalesce in large measure the separately existing water and dispersed brine droplets, each treating-separating step including also the separation of the coalesced aqueous material to produce an oil of reduced saline-impurity content and containing a residual quantity of water, whereby the oil resulting from the first treating-separating step and as modified by treatment in the electric field of said first treating-separating step is subsequently subjected to the second dispersing step and then to the second treating-separating step, the water dispersed into the oil in said second dispersing step having a sufficiently low concentration in said saline impurities to remove in said second treating-separating step a further amount of saline impurities from the oil resulting from the first treating-separating step and the water dispersed into the oil in said first dispersing step comprising coalesced aqueous material separating in said second treating-separating step.

12. A process as defined in claim 1, in which each of the dispersing steps comprises continuously mixing streams of oil and water, and in which the resulting dispersion is continuously delivered to the succeeding treating-separating step for continuous separation of the coalesced aqueous phase and the oil, the water added in the last dispersing step being relatively fresh and the coalesced aqueous phase separating in each of the treating-separating steps except the first being used as the water employed in the dispersing step immediately ahead of the immediately preceding treating-separating step whereby the added water becomes progressively augmented in its content of water-dispersible impurities, the added water dispersed into the incoming impure oil in the first dispersing step having a sufficiently low concentration in said impurities to be effective in removing impurities from said impure oil in said first treating-separating step and the aqueous phase separated in the first treating-separating step being discharged from the process.

13. A process for treating a mineral oil containing no more than a few per cent of water, said oil containing naturally-occurring emulsifying agents tending to stabilize oil-continuous emulsions, said oil containing water-dispersible impurities and being capable of extraction by relatively fresh water in the process to produce counter-emulsifying agents in the extract, which process includes the steps of: subjecting the impure oil to a dispersing step followed by a treating-separating step, the dispersing step comprising dispersing water in the oil and being performed in such manner as to form an oil-continuous dispersion containing droplets of the added water existing separately from impurities, the succeeding treating-separating step including subjection of the resulting dispersion to the action of an electric field of sufficient intensity to coalesce the aqueous phase and cause impurities to become associated therewith, and said treating-separating step including also the separation of the coalesced aqueous phase containing the associated impurities to produce an oil containing a residual quantity of water, the water dispersed into said oil in said dispersing step being sufficiently fresh to extract from the incoming impure oil materials comprising counter-emulsifying agents which appear in the separated aqueous phase, the water dispersed into the oil in said dispersing step being a composite water formed in part of a portion of said separated aqueous phase and in part of a portion of a relatively fresher water, said portions being blended to form a composite water dispersed into said impure oil in said dispersing step.

14. A process for treating a mineral oil to remove saline impurities therefrom, said oil containing dispersed brine droplets in which saline impurities are dissolved, said oil containing no more than a few per cent of water and containing naturally-occurring emulsifying agents tending to stabilize oil-continuous emulsions, which process includes the steps of: subjecting the impure oil to a dispersing step followed by a treating-separating step, the dispersing step comprising dispersing brackish water into the oil and being performed in such manner as to form an oil-continuous dispersion containing droplets of the added brackish water existing separately from dispersed brine droplets of the oil, the succeeding treating-separating step including subjection of the resulting dispersion to the action of an electric field of sufficient intensity to coalesce in large measure the separately existing droplets of the added brackish water and dispersed brine droplets and said treating-separating step including also the separation of the coalesced aqueous material to produce an oil containing a residual quantity of water, said brackish water dispersed into the oil in said dispersing step comprising in part a portion of the aqueous material separated in said treating-separating step and in part a fresher water less concentrated in said saline impurities than said separated aqueous material, said fresher water and said aqueous material being combined before being dispersed into the oil in said dispersing step.

15. A continuous process for the treatment of a mineral oil to remove saline impurities therefrom, said oil containing dispersed brine droplets in which saline impurities are dissolved and containing materials extractible by a relatively dilute brackish water, when mixed with the oil and separated therefrom, to form counter-emulsifying agents appearing in the separated water, said oil containing no more than a few per cent of water and containing naturally-occurring emulsifying agents tending to stabilize oil-continuous emulsions, which process includes the steps of: continuously mixing streams of the impure oil and relatively dilute brackish water, said mixing being of sufficient intensity to disperse the relatively dilute brackish water into the oil in such manner as to form an oil-continuous dispersion containing droplets of the added relatively dilute brackish water existing separately from dispersed brine droplets of the oil; and continuously subjecting the resulting dispersion to a treating-separating step including subjection of the resulting dispersion to the action of an electric field of sufficient intensity to coalesce in large measure the separately existing droplets of added relatively dilute brackish water and dispersed brine droplets, said treating-separating step including also the separation of the coalesced aqueous material to produce an oil containing a residual quantity of water, said relatively dilute brackish water dispersed into the oil in said dispersing step being formed by continuously withdrawing a portion of the coalesced aqueous material separated in said treating-separating step and continuously blending this portion with a less brackish water to produce said relatively dilute brackish water dispersed into the oil, said portion of said coalesced aqueous material containing counter-emulsifying agents, whereby these agents are incorporated into the relatively dilute brackish water before mixing same with the impure oil.

CLAUDIUS H. M. ROBERTS

CERTIFICATE OF CORRECTION.

Patent No. 2,355,678. August 15, 1944.

CLAUDIUS H. M. ROBERTS.

It is hereby certified that error appears in the above numbered patent requiring correction as follows: In the drawing, Figures 1, 2 and 3 should appear as shown below instead of as in the patent -

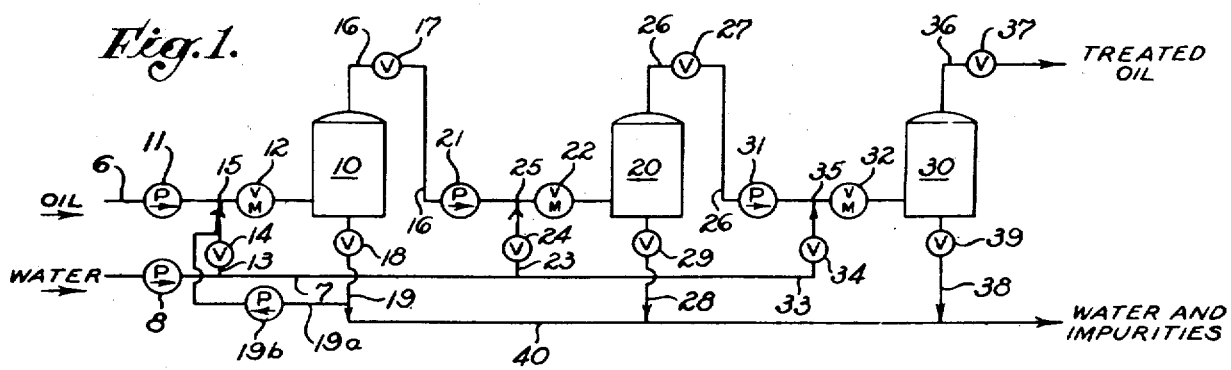

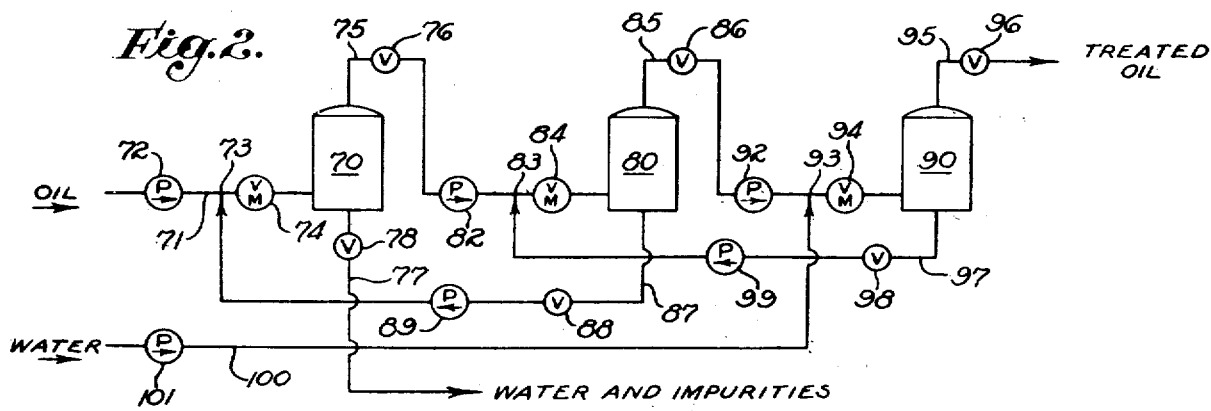

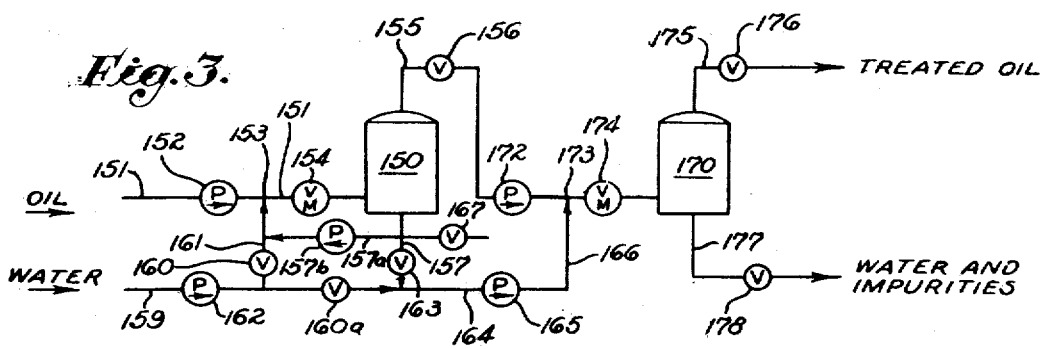

page 1, first column, line 54, for the words "consisting of both the" read --containing both--; line 55, and second column, line 1, strike out "consisting"; page 2, second column, line 11, beginning with "The disper-

CERTIFICATE OF CORRECTION.

Patent No. 2,355,678.  August 15, 1944.

CLAUDIUS H. M. ROBERTS.

sion" strike out all to and including "or 43." in line 16, same page and column; line 44, beginning with "Where the bleed" strike out all to and including "oil." in line 52, same page and column; page 3, first column, lines 19 to 22 inclusive, strike out "Any desired chemicals may be added to the oil stream, water stream, or stream of dispersion through valved inlet pipes 44, 45, or 46, respectively."; page 3, first column, lines 42 and 43, strike out "and, again, suitable modifying agents may be added through pipes 47, 48, or 49"; line 49, for "reduced" read --reduce--; and second column, line 12, before "the degree" insert --for example,--; lines 66 to 69 inclusive, strike out "particularly when it is found advisable to treat or modify the water by the addition of chemical agents,"; page 4, second column, line 33, strike out "or chemicals"; page 5, first column, line 66, beginning with the words "Reference has been made" strike out all to and including "required." in line 8, same page, second column; page 6, first column, line 60, beginning with "As was described" strike out all to and including "additions." in line 68, same page and column; page 8, first column, lines 4, 5 and 6, strike out "Suitable modifying agents may be added by means of valved inlet lines 190 to 195, respectively, as previously described."; lines 39 and 40, strike out ", although. in some instances, other types of separators may be used--; line 50, strike out "be"; line 54, strike out "as"; and that the said Letters Patent should be read with this correction therein that the same may conform to the record of the case in the Patent Office.

Signed and sealed this 3rd day of April, A. D. 1945.

Leslie Frazer (Seal)  Acting Commissioner of Patents.